US006450436B1

United States Patent
Tsuji et al.

(10) Patent No.: US 6,450,436 B1
(45) Date of Patent: Sep. 17, 2002

(54) PORTABLE ELECTRIC APPLIANCE WITH CORD HOLDER

(75) Inventors: Masao Tsuji, Germantown; Francisco J. Carbajal, Cordova, both of TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/766,527

(22) Filed: Jan. 22, 2001

(51) Int. Cl.[7] .............................................. B65H 75/44
(52) U.S. Cl. .................................. 242/400.1; 191/12 R
(58) Field of Search .......................... 242/400.1, 405.1, 242/405.2; 191/12 R, 12.2 R; 248/51, 52; 24/909, 115 R, 115 J

(56) References Cited

U.S. PATENT DOCUMENTS

| | | | | |
|---|---|---|---|---|
| 1,082,069 A | * | 12/1913 | Clements | 242/400.1 |
| 1,754,162 A | * | 4/1930 | Colegrove | 242/400.1 |
| 2,033,491 A | * | 3/1936 | Sprague et al. | 242/400.1 |
| 2,193,989 A | * | 3/1940 | Smellie | 242/400.1 |
| 2,573,636 A | * | 10/1951 | Wilson | 242/400.1 |
| 3,476,331 A | * | 11/1969 | Green et al. | 242/400.1 |
| 5,056,698 A | * | 10/1991 | Kozakevich | 248/52 |
| 6,003,804 A | * | 12/1999 | Vara | 242/400.1 |

* cited by examiner

Primary Examiner—John M. Jillions
(74) Attorney, Agent, or Firm—Baker, Donelson, Bearman & Caldwell

(57) ABSTRACT

A portable electric appliance (10) has a housing with recesses (20) in which posts (25) are mounted for movement between extended and retracted positions. The appliance power cord is wrapped about the posts for storage in their extended positions and held in a notch (31) of a post flange (30).

7 Claims, 4 Drawing Sheets

PORTABLE ELECTRIC APPLIANCE WITH CORD HOLDER

TECHNICAL FIELD

The invention relates to portable, electric powered appliances such as humidifiers, air purifiers and fans.

BACKGROUND OF THE INVENTION

Portable electric appliances commonly have a power cord that is several feet long. The cord terminates with a plug that may be plugged into a wall socket to access a source of municipal power. This is done when the appliance is ready for or actually is in use. When not in use, as when being moved about or stowed, the power cord must be held or otherwise it will drag during transport. During storage it should be held or coiled for compactness and neatness.

Heretofore portable electric appliances have been equipped with means for holding their power cord. Vacuum cleaners, for example, commonly have hooks or cleats mounted to their vacuum tubes. Their power cords are wrapped over these along the tubes when the appliance is not in use. Other appliances have been equipped with means for retracting and storing the cord inside the appliance housing. These employ spring loaded reels and thus have moving parts and are more expensive. Others have had racks mounted to their housing for this purpose. Exemplary of these are those shown in U.S. Pat. Nos. 2,033,491, 3,476,331 and 6,003,804.

Most power cord holders have provided projections in one form or another. This presents little problem when the cord is wrapped about them. However, when the appliance is not in use these projections not only present a hazard, they also prevent the appliance from being placed flushly or a least closely aside a wall. Small appliances are commonly located on kitchen countertops where space is at a premium. Even those larger ones that are set upon floors, such as air purifiers, humidifiers, space heaters and fans, are preferably located closely aside a wall.

Accordingly, it is seen that a need has long existed for portable, electric powered appliances to be provided with power cord holders that are readily accessible and easy to use and yet which do not provide protrusions of significance when not in use. It thus is to the provision of such that the present invention is primarily directed.

SUMMARY OF THE INVENTION

In a preferred form of the invention, a portable electrically powered appliance has a housing, an electric load housed within the housing, and an electric power cord coupled with the load. The power cord extends out of the housing for connection to a source of electric power. The housing has a generally flat side formed with two recesses and two posts with manually gripable flanges. The posts are repositionably mounted to the housing side recesses for movement between a retracted position with their flanges generally coplanar with the housing side and an extended position with their flanges located outboard of the side. So constructed, the electric power cord may be wrapped about the posts for appliance transportation and storage with the posts in their extended positions and the posts retracted when the appliance is in use so that they do not present protrusions.

BRIEF DESCRIPTION OF THE DRAWING

FIG. 4 is an enlarged view of a portion of the air purifier showing one of its cord holding posts in its retracted position while

DETAILED DESCRIPTION

Figure 1:
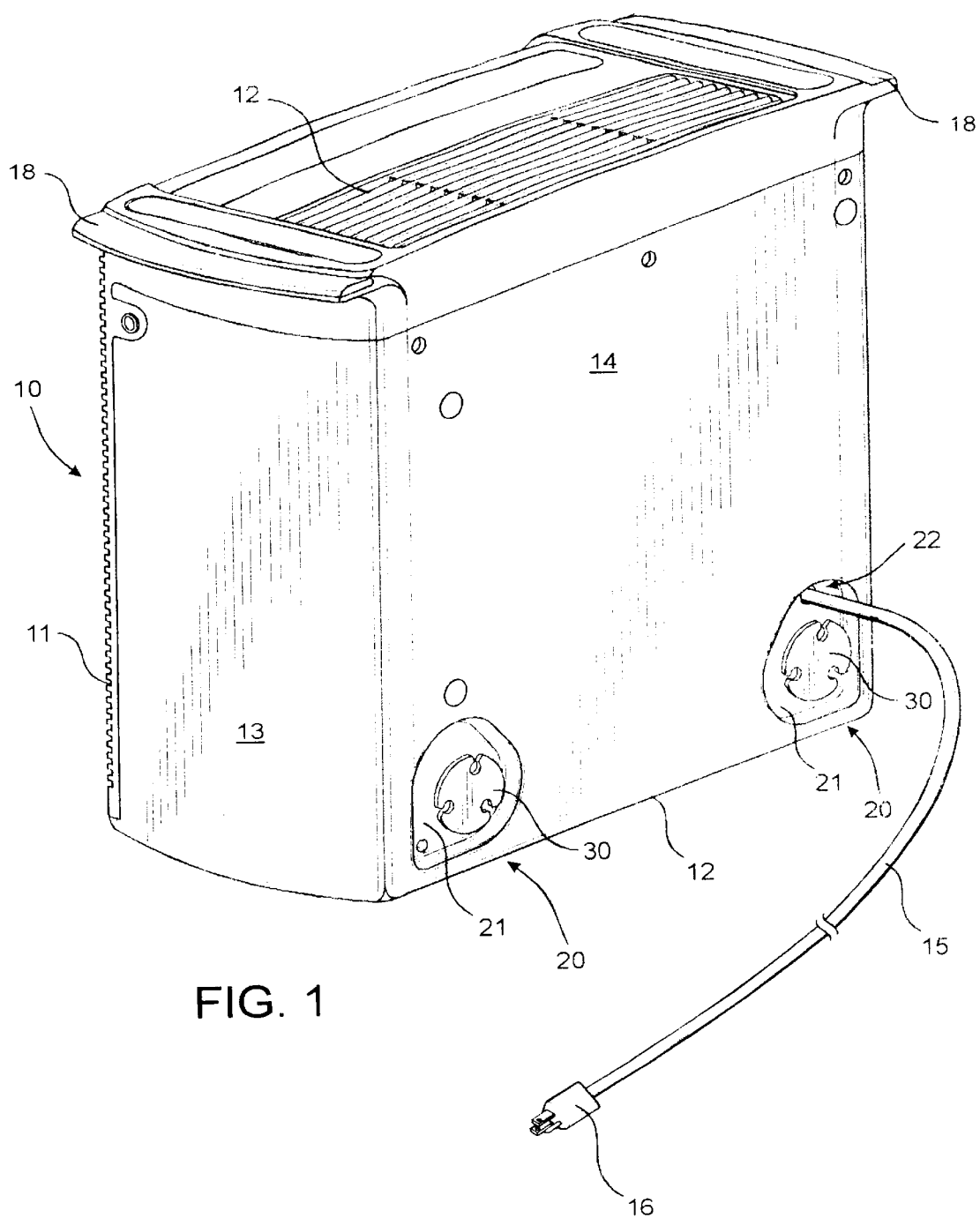
FIG. 1 is a perspective view of an air purifier that incorporates principles of the invention in a preferred form shown with its power cord loose.

Referring now in more detail to the drawing, there is shown an air purifier 10 that is of conventional structure save for its inclusion of means for holding its power cord in a stowed configuration. The air purifier has a housing with a grill 11 on its front side that provides an air inlet and another grill 12 on its top that provides an air outlet. The housing also has a bottom 12, two opposite sides 13 and a back 14. The air purifier has an unshown blower and filter conventionally mounted inside the housing between the air inlet and air outlet. The blower fan is driven by an electric motor from which a power cord 15 extends. The cord terminates with a plug 16. Upon insertion of the plug into a socket the unit may be connected with a source of municipal power upon operation of its on/off switch. The housing is formed with two hand grips 18 for portability.

The back side 14 of the housing is generally flat except for two recesses in its two bottom corners. The principal walls 21 of the recesses are flat and parallel to the back side 14. One recess wall 21 is formed with a hole 22 through which the power cord 15 extends. Each recess is formed with a central opening through which a cylindrical post 25 extends. The inboard end of the post is formed with two pairs of short slits 26 that straddle a chambered or beveled locking tab 27. The outboard end of the post is formed with a disc-shaped or maple leaf flange 30 that has three angularly spaced notches 31. The post may be readily mounted to the housing rear side by inserting its end whereupon the tabs are momentarily flexed inwardly and then spring back to serve as stop. The posts may then be moved between the retracted position shown in FIG. 4 and the extended positions shown in FIG. 5. In their retracted positions their flanges are located in the recesses 20 while in their extended positions they are located outboard of the rear side 14.

Figure 4:
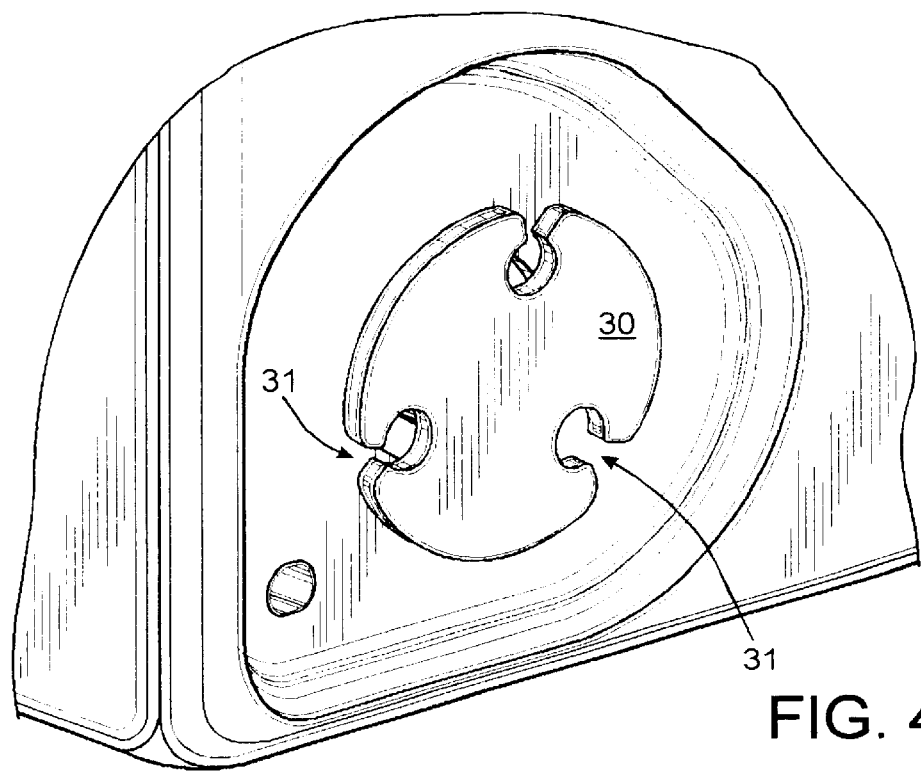
Figure 5:
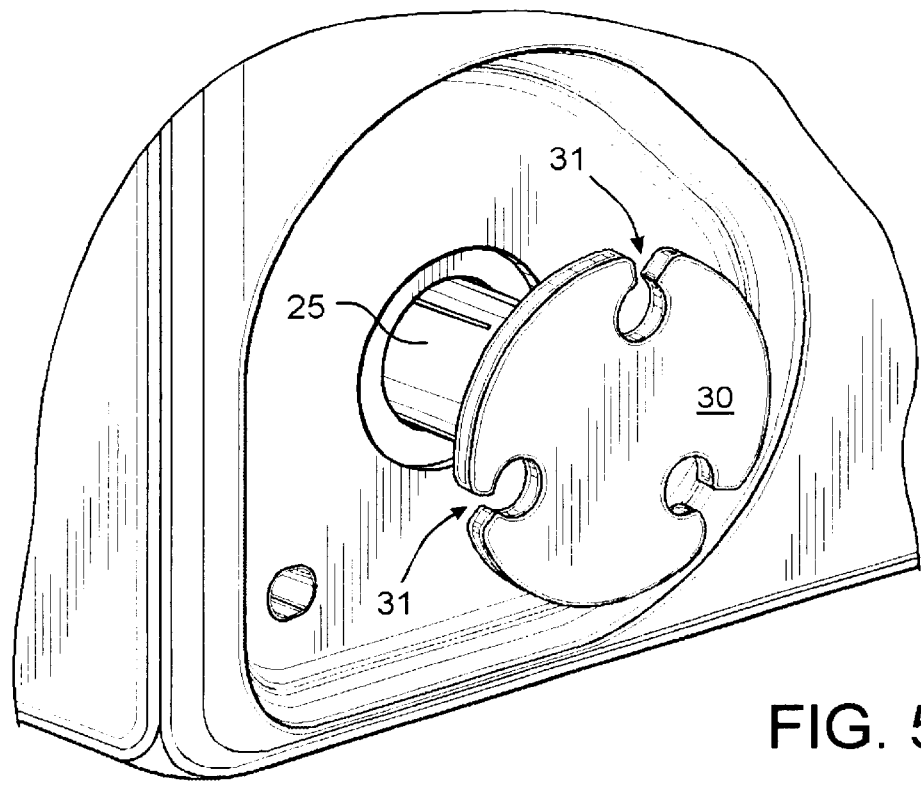
FIG. 5 shows it in its extended position.

In use the power cord plug is inserted into an electrical receptacle like a common wall socket. The posts are recessed as shown in FIGS. 1 and 4. So configured they do not provide protrusions that can present a hazard. This also enables the purifier to be set closely beside a wall. Indeed, this enables the unit, whether it be an air purifier, or humidifier, or simply a fan, to be placed flush against a room wall. If full flush placement is desired a small channel is formed in the rear side that extends from a recess 20 to a side 13 to receive the cord 15.

Figure 2:
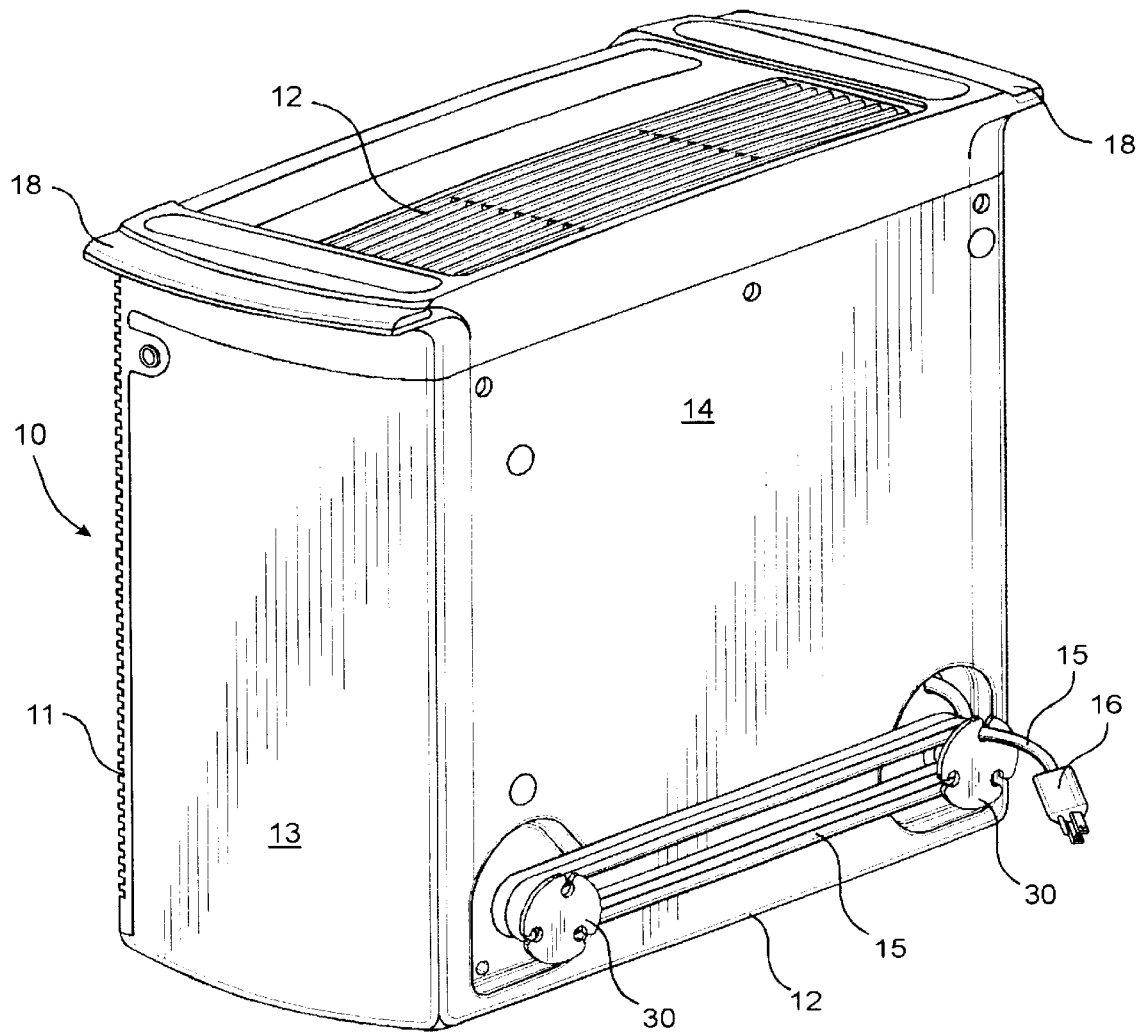
FIG. 2 is a perspective view of the air purifier of FIG. 1 shown with its power cord stowed.
Figure 3:
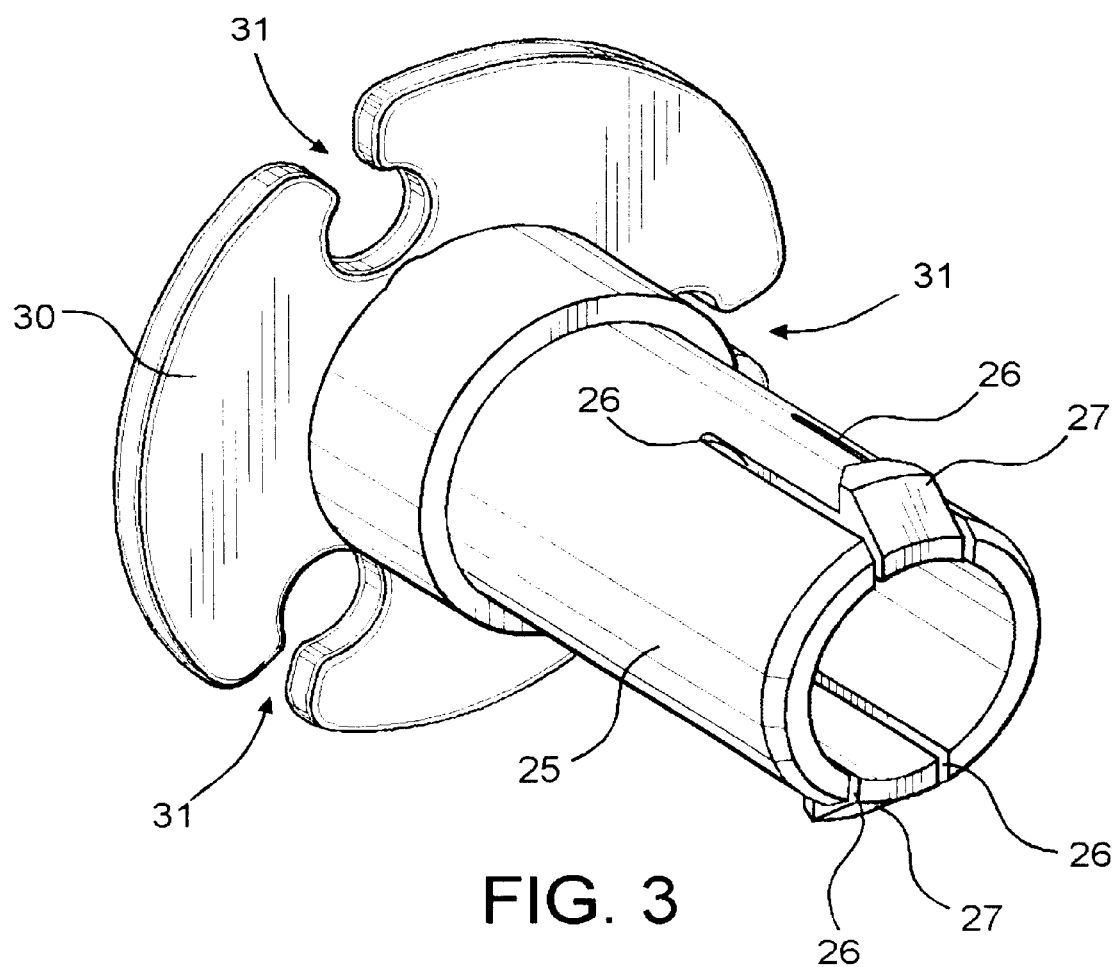
FIG. 3 is an enlarged view, in perspective, of one of the two cord holding posts shown in FIGS. 1 and 2.

During storage or transportation the cord is wrapped about the post as shown in FIG. 2. This is done by manually pulling the two flanges 30 outwardly and then wrapping the cord about the post 25. The cord is then seated in a notch 31.

It thus is seen that a portable electric appliance is now provided with improved means for holding its power cord. Although the invention has been shown and described in its preferred form, it should be understood that many modifications, changes or additions may be made without departure from the spirit and scope of the invention as set forth in the following claims.

What is claimed is:

1. A portable electrically powered appliance having a housing and a power cord which extends out of said housing for connection to a source of electric power, and wherein said housing has a side formed with two recesses and two posts with manually gripable flanges- repositionably mounted to and extending from said two side recesses for movement inboard between a retracted position with said flanges located inboard said side recesses and an extended position with said flanges located outboard of said side recesses, whereby the power cord may be wrapped about the posts for appliance transportation and storage with the posts in their extended positions and the posts retracted when the appliance is in use.

2. The portable electric appliance of claim 1 wherein said flanges have a notch in which an end of said electric cord may be held.

3. The portable electric appliance of claim 1 wherein one of said housing recesses has a hole through which said electric cord extends adjacent one of said posts.

4. A portable electrically powered appliance having a housing through which a power cord extends and means for holding said power cord flushly aside one side wall of said housing, said means includes a post that is retractably and extendable mounted to said housing between a retracted position wherein said entire post is positioned inboard of said side wall and an extended position wherein a portion of said post is positional outboard of said side wall.

5. The portable electrically powered appliance of claim 4 wherein said cord holding means comprising a second post retractable and extendably mounted to said housing spaced from the other post.

6. The portable electrically powered appliance of claim 4 wherein said housing has a generally flat rear side formed with a recess in which said post is mounted.

7. The portable electrically powered appliance of claim 6 wherein said post is formed with a flange with a notch through which said power cored may be passed.

* * * * *